United States Patent
Fioravanti et al.

(10) Patent No.: US 6,914,742 B1
(45) Date of Patent: Jul. 5, 2005

(54) DATA STORAGE ASSEMBLY WITH ROBUST SERVO WRITING METHODOLOGY

(75) Inventors: Louis J. Fioravanti, Boulder, CO (US); Frank W. Bernett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 340 days.

(21) Appl. No.: 10/126,766

(22) Filed: Apr. 19, 2002

Related U.S. Application Data

(60) Provisional application No. 60/300,328, filed on Jun. 22, 2001.

(51) Int. Cl.[7] .................. G11B 21/02; G11B 33/14
(52) U.S. Cl. ............................ 360/75; 360/97.02
(58) Field of Search ............... 360/75, 69, 25, 360/31, 97.01, 97.02, 97.03, 97.04

(56) References Cited

U.S. PATENT DOCUMENTS

| | | |
|---|---|---|
| 4,068,268 A | 1/1978 | Idemoto et al. |
| 4,969,056 A | 11/1990 | Negishi et al. |
| 5,243,479 A | 9/1993 | Nakagoshi et al. |
| 5,341,255 A | 8/1994 | Starr et al. |
| 5,465,182 A | 11/1995 | Ishikawa |
| 5,585,912 A | 12/1996 | Shin et al. |
| 5,654,841 A | 8/1997 | Hobson et al. |
| 6,097,565 A | 8/2000 | Sri-Jayantha et al. |
| 6,119,534 A | 9/2000 | Dinsmore |
| 6,144,178 A | 11/2000 | Hirano et al. |
| 6,178,059 B1 | 1/2001 | Frees |
| 6,207,252 B1 | 3/2001 | Shimomura |
| 6,247,725 B1 | 6/2001 | Moller |
| 2001/0003630 A1 | 6/2001 | Aonuma et al. |
| 2001/0006435 A1 | 7/2001 | Ichihara et al. |
| 2001/0008502 A1 | 7/2001 | Watanabe |
| 2003/0007280 A1 * | 1/2003 | Bernett et al. ........... 360/77.02 |
| 2003/0081344 A1 * | 5/2003 | Fioravanti et al. ............ 360/75 |
| 2004/0021980 A1 * | 2/2004 | Albrecht et al. ......... 360/97.02 |

* cited by examiner

Primary Examiner—Andrew L. Sniezek
(74) Attorney, Agent, or Firm—Fellers, Snider, et al.

(57) ABSTRACT

A method for writing servo information to a data storage medium adapted for use in a data storage device wherein the medium is operably moved in ambient air at a nominal speed in data reading and writing relationship with a data transfer member. In one embodiment the method for writing comprises placing the medium adjacent a data transfer member in an enclosure containing a gaseous environment as a selected state; moving the medium to impart velocity to the gaseous environment which, in turn, impacts the data transfer member with forces flying the writing member at a first fly height from the medium; and subsequently introducing a gas having a density less than the gaseous environment into the enclosure, thereby responsively reducing the fly height of the writing member to a selected height less than the first fly height.

16 Claims, 8 Drawing Sheets

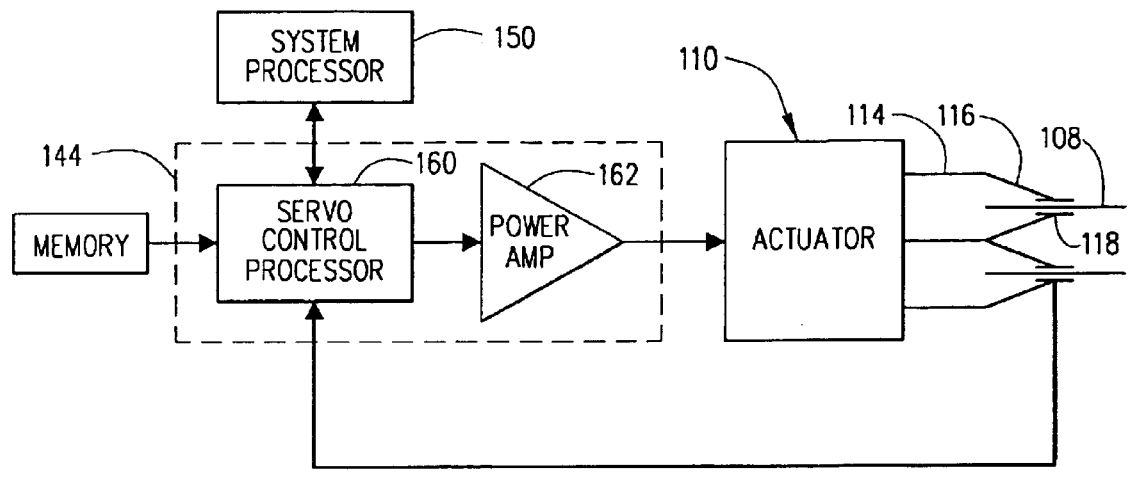
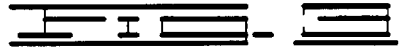
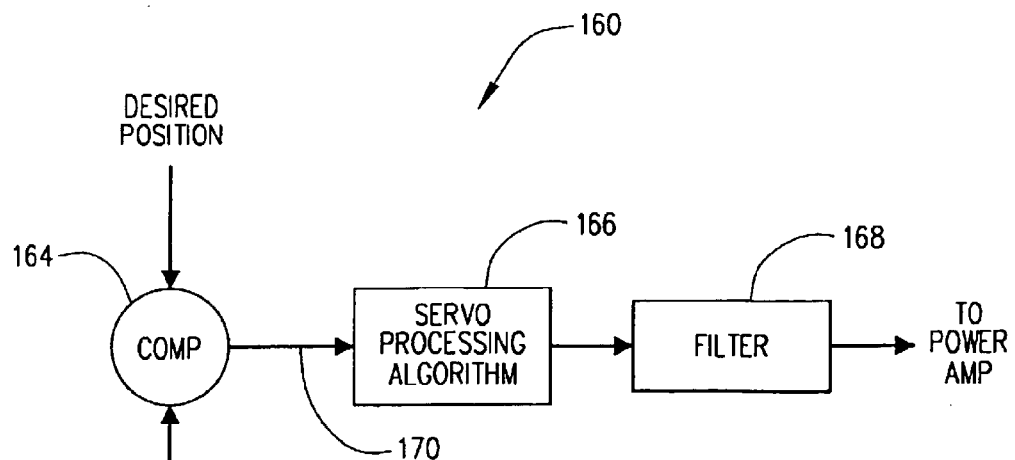
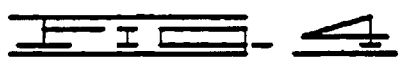

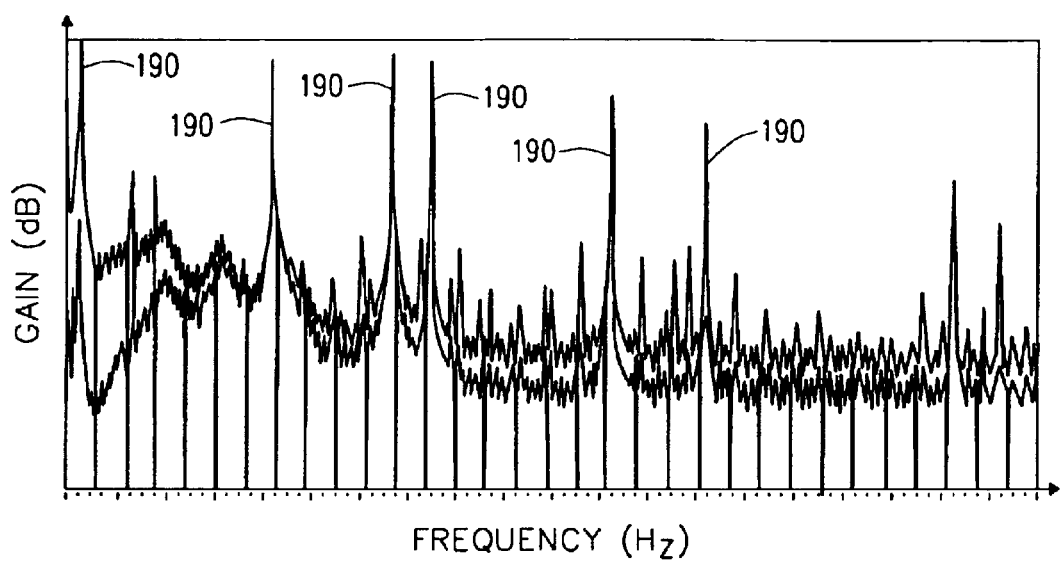
PRIOR ART
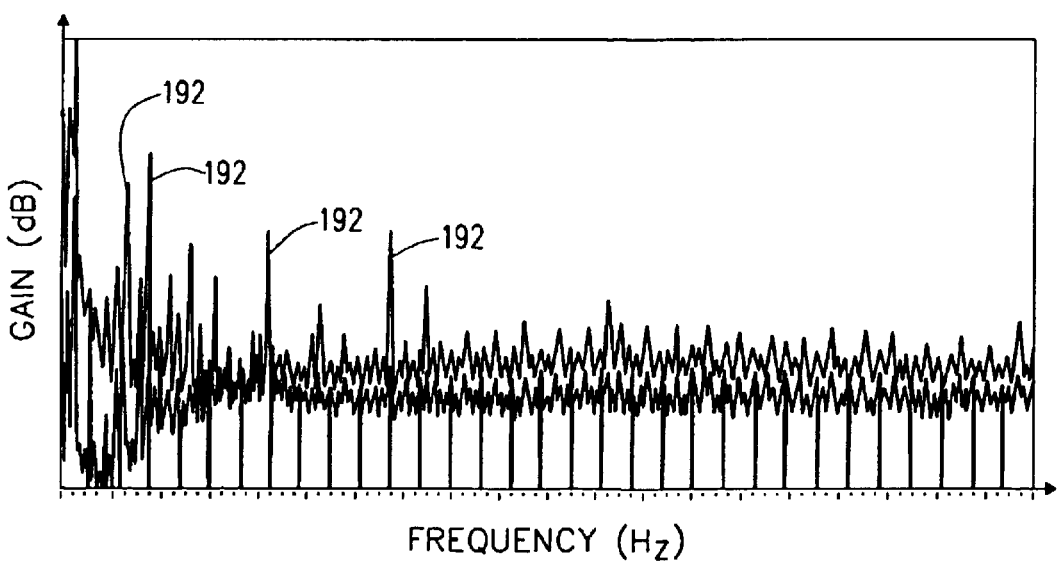
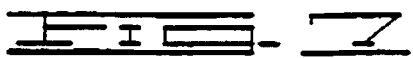

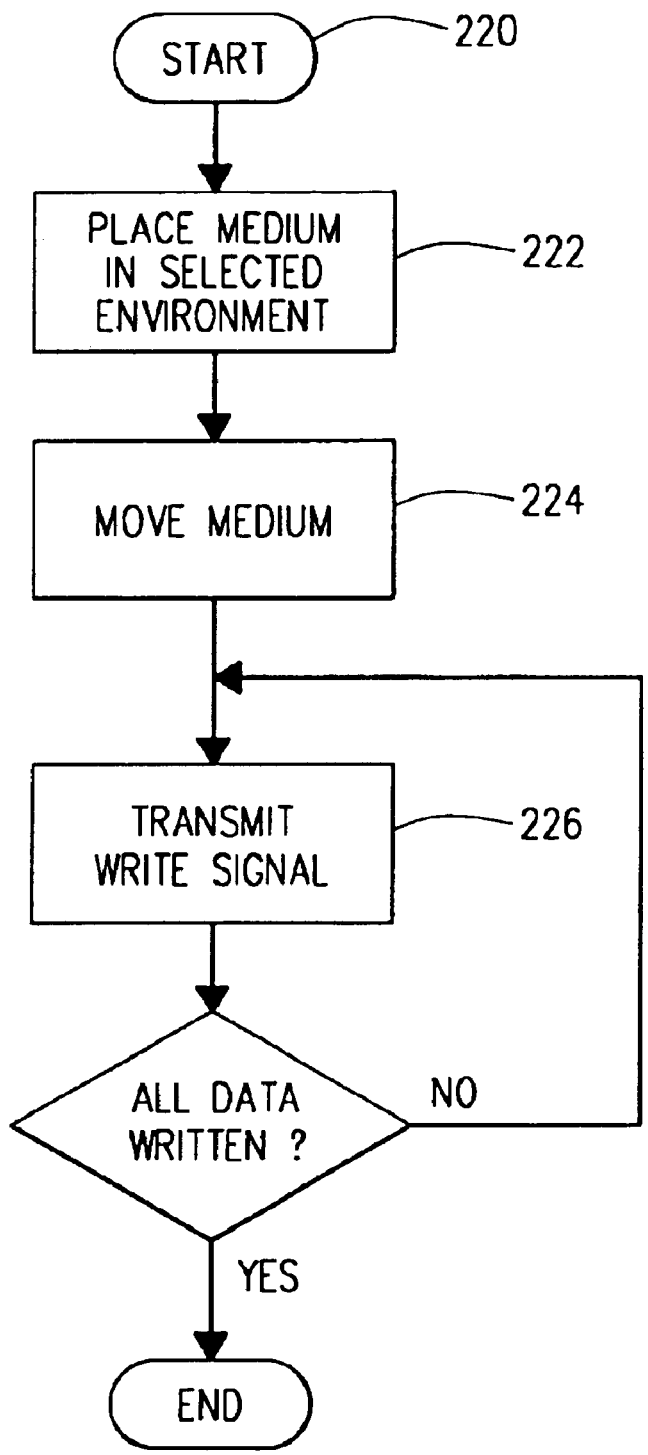

DATA STORAGE ASSEMBLY WITH ROBUST SERVO WRITING METHODOLOGY

CROSS REFERENCE TO RELATED APPLICATIONS

This application claims the benefit of U.S. Provisional Application No. 60/300,328 filed Jun. 22, 2001.

FIELD OF THE INVENTION

This invention relates generally to the field of data storage devices and more particularly but without limitation to the writing of servo information to the data storage medium of the data storage device.

BACKGROUND OF THE INVENTION

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into a series of generally concentric data tracks where data is stored in the form of magnetic flux transitions.

A data transfer member (sometimes referred to as a read/write head) such as a magnetic transducer is moved by an actuator assembly to selected positions adjacent the data storage surface. The active elements of the read/write head are supported by suspension structures extending from the actuator assembly. The active elements are maintained a small distance above the data storage surface as the read/write head flies upon an air bearing generated by air currents caused by the spinning discs.

Each read/write head is typically provided with separate read and write elements, with a common configuration utilizing a thin film, inductive write element and a magneto-resistive (MR) read element. Data are written by passing a write current through the write element, with the write current generating a time-varying magnetic field which accordingly magnetizes the disc surface. Previously written data are read using the read element to transduce the selective magnetization of the disc to generate a read signal, which is received by a read channel to reconstruct the data.

The actuator assembly operates within a negative feedback, closed-loop servo system. Servo information is preliminarily written in the form of servo tracks that permit the read/write heads to be properly positioned during data reading and writing operations. A servo controller samples the position of the read/write heads relative to the servo track information and generates an error signal based upon the difference between the actual position and the reference position. This error signal is then used to drive the data head to the desired reference point, typically by demanding a current through a voice coil motor (VCM) which forms a part of the actuator assembly.

As data storage areal density has increased, the precision with which the servo track data must be written has become more important. Many mechanical vibrations, which hitherto could be ignored as negligible, produce disturbances that can result in erratic or distorted servo tracks. Such distortion can produce increases in error position signals, leading to unacceptable margin losses when attempting to seek or follow a particular servo track. This results in drive performance degradation, decreased capacity and increased reading and writing failures.

One of the prominent sources of disturbances is disc resonance and resonance imparted to the head and gimbal assembly. Many attempts have been made at modifying the amplitudes and frequencies of such resonances to prevent the associated adverse effect on servo track writing. Many attempts have also been made to improve servo track writing devices and associated methods, so as to stabilize the process.

One proposed solution is to perform the servo track writing operations within a helium environment, which affords a relatively more stable environment imparting less resonance on the disc and actuator assembly. It has been determined, however, that significant process improvements are possible by understanding the characteristics of the read/write head fly height within a controlled environment. Generally, servo tracks can be written more accurately by flying the head closer to the data storage medium. Also, it is possible to increase the throughput of a servo track writer apparatus by increasing the speed of the data storage medium during servo track writing within a less dense gaseous environment for a particular fly height. It is to these improvements and others as exemplified by the description and appended claims that embodiments of the present invention are directed.

SUMMARY OF THE INVENTION

Embodiments of the present invention are directed to a method for writing servo information to a data storage medium adapted for use in a data storage device wherein the medium is operably moved in ambient air within the data storage device at a nominal speed in a data reading and writing relationship with a data transfer member.

In one embodiment the method for writing comprises placing the medium adjacent a writing member in an enclosure containing a gaseous environment at a selected state; moving the medium at a substantially constant speed, imparting velocity to the gaseous environment which, in turn, impacts the writing member with forces flying the writing member at a first fly height from the medium; subsequently introducing a gas having a density less than the gaseous environment into the enclosure, thereby responsively reducing the fly height of the writing member to a selected height less than the first fly height; and transmitting a write signal to the writing member which, in turn, responsively affects the medium to record data represented by the write signal.

In one aspect the embodiments of the present invention contemplate a disc stack assembly adapted for use in a data storage device wherein the disc stack assembly is operably moved in ambient air at a nominal speed in data reading and writing relationship with a data transfer member, the disc stack assembly comprising a data storage medium comprising servo information written by a method in accordance with the embodiments of the present invention.

These and various other features as well as advantages which characterize the embodiments of the present invention will be apparent upon reading of the following detailed description and review of the associated drawings.

BRIEF DESCRIPTION OF THE DRAWINGS

FIG. 3 is a diagrammatic block illustration of the servo control circuit of FIG. 2.

FIG. 4 is a diagrammatic block diagram of a servo control processor constructed in accordance with an embodiment of the present invention.

FIG. 7 illustrates a frequency domain for a data storage device with a data storage medium having servo tracks written in accordance with embodiments of the present invention.

FIG. 8 is a flow chart of a method for writing servo information to a data storage medium in accordance with embodiments of the present invention.

FIG. 9 is a flow chart of a method for writing servo information to a data storage medium in accordance with embodiments of the present invention.

DETAILED DESCRIPTION

Figure 1:
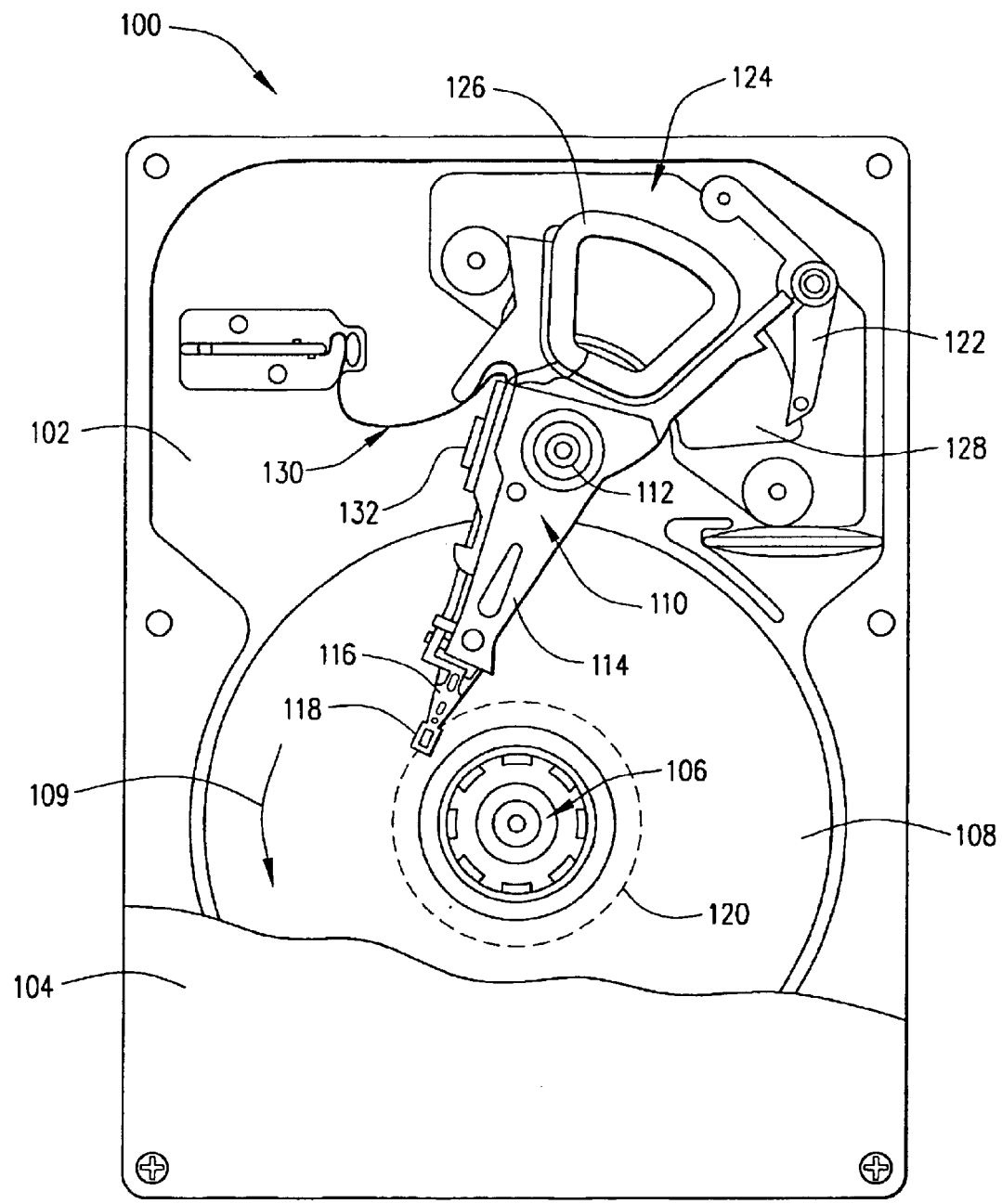
FIG. 1 is a partially cutaway plan view of a data storage device constructed in accordance with an embodiment of the present invention.

FIG. 1 provides a top plan view of a disc drive 100 of the type used to interface with a host computer to magnetically store and retrieve user data. The disc drive 100 includes a base deck 102 to which various components of the disc drive 100 are mounted. A top cover 104 (shown partially cutaway) cooperates with the base deck 102 to form an internal, sealed environment for the disc drive 100.

A spindle motor 106 rotates one or more magnetic recording discs 108 at a constant high speed (in thousands of revolutions per minute) in a direction denoted by arrow 109. User data are written to and read from tracks on the discs 108 through the use of an actuator assembly 110, which rotates about a bearing shaft assembly 112 adjacent the discs 108. The actuator assembly 110 includes a plurality of rigid actuator arms 114, which support flexible suspension assemblies 116, also sometimes referred to as flexures. A read/write head 118 is supported at the end of each flexure 116 to interface with the corresponding disc surfaces of the discs 108. The magnetic recording discs 108 are secured to the spindle motor 106 by a clamp ring 119. The magnetic recording discs 108, the spindle motor 106 and the clamp ring 119 collectively form a disc stack assembly 121.

When the disc drive 100 is not in use, the heads 118 are parked on landing zones 120, and the actuator assembly 110 is secured using a magnetic latch assembly 122. A voice coil motor 124, also referred to as a VCM, controls the position of the heads 118 through application of a current, or "driving energy," to a coil 126 which interacts with a magnetic circuit including a permanent magnet 128. A flex assembly 130 facilitates electrical communication between the actuator assembly 110 and a disc drive printed circuit board (PCB) mounted to the underside of the base deck 102; the flex assembly 130 includes a preamplifier/driver circuit 132 (preamp) which electrically interfaces with the heads 118. The disc drive PCB houses the electronic circuitry used to control the operation of the disc drive 100.

Figure 2:
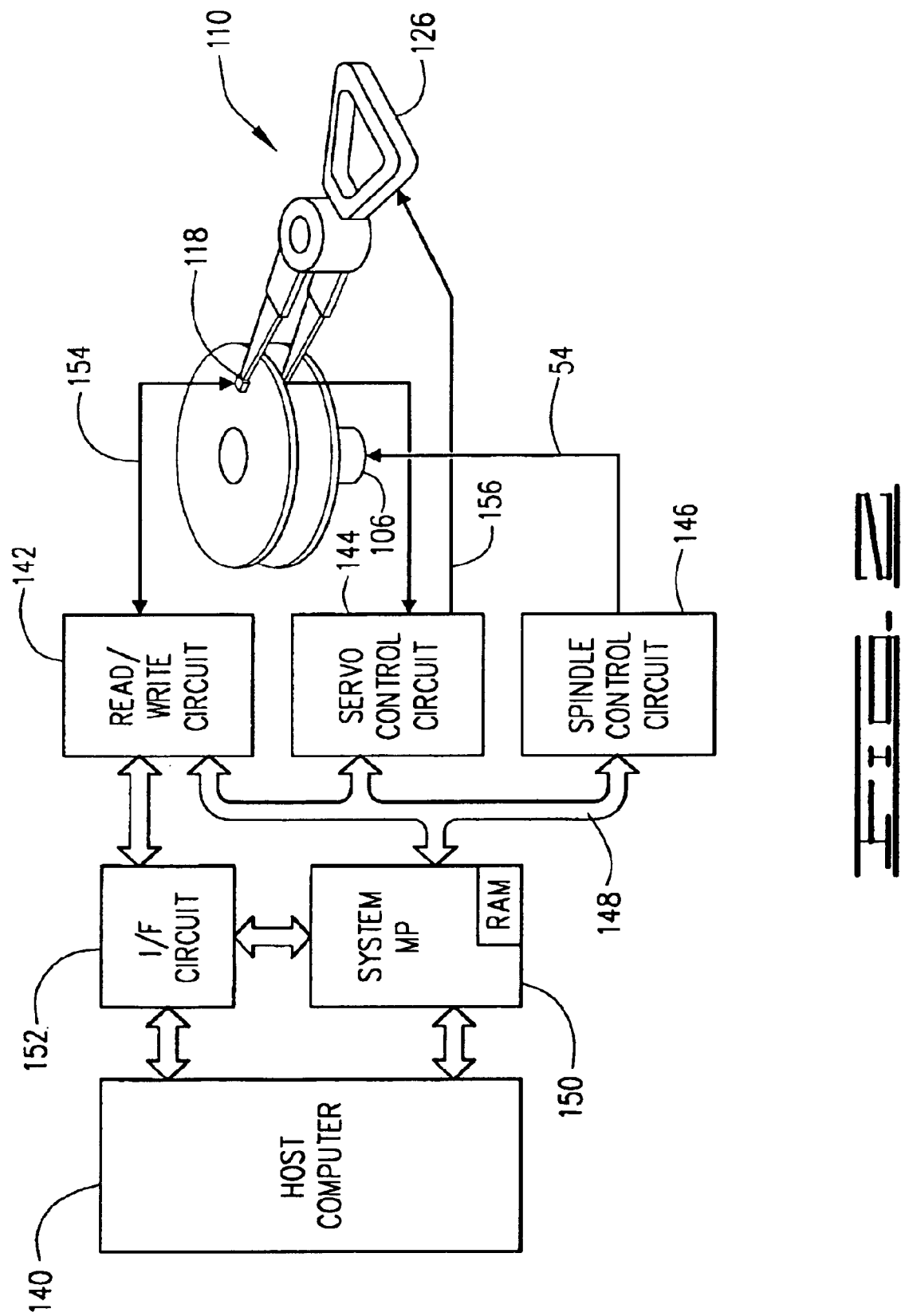
FIG. 2 is a functional block diagram of the data storage device of FIG. 1.

Turning to FIG. 2, shown therein is a simplified functional block diagram of the disc drive 100 of FIG. 1, operably connected to a host computer 140. More particularly, FIG. 2 shows the disc drive 100 to generally comprise a read/write circuit 142, a servo control circuit 144 and a spindle control circuit 146, all operably connected by way of a control bus 148 to a system microprocessor 150. It will be recognized that the control bus 148 has the necessary connections for the system processor 150 to communicate with and control the disc drive circuits. Additionally, an interface circuit 152 is connected to the read/write circuit 142 and to the system microprocessor 150, with the interface circuit 152 as a data interface for the disc drive.

The servo control circuit 144 receives servo position information from one or more heads 118, whether a dedicated servo or embedded servo system respectively, and in response thereto provides a correction signal, or driving energy, by way of signal path 156 to the coil 126 of the actuator assembly 110. FIG. 3 is a diagrammatic block diagram depicting this negative feedback, closed-loop servo system, wherein the servo control circuit 144 comprises a servo control processor 160 and an amplifier 162.

The system processor 150 receives a command signal from the host 140 (FIG. 2) which indicates that a certain portion of a selected one of the discs 108 is to be accessed. In response to the command signal, the system processor 150 provides servo control processor 160 with a signal indicating which head 118 is selected for reading from or writing to the disc 108. The system processor 150 also provides the servo control processor 160 with a position signal which indicates a particular cylinder over which the actuator assembly 110 is to position the heads 118.

Servo control processor 160 converts the position signal into an analog driving energy signal which is provided to the actuator assembly 110. In an illustrative embodiment, the driving energy signal is amplified by the power amplifier 162 which then provides the required driving energy to the actuator assembly 110. In response to the driving energy, the actuator assembly 110 moves the data head 118 radially over the surface of the disc 108 for track seek operations and holds the data head 118 directly over a track on the disc 108 for track following operations. In an illustrative embodiment, the driving energy comprises an electrical current which is supplied to the coil 126 portion of the actuator assembly 110.

The servo control processor 160 samples the position of the head 118 and compares the actual position of the head 118 with the desired position requested by the system processor 150. Based upon the difference between the actual position and the desired position of the head 118, the servo control processor 160 then generates a corrective driving energy signal which is provided to the actuator assembly 110.

FIG. 4 is a simplified block diagram of the servo control processor 160 of FIG. 3, comprising a comparator 164, a servo processing algorithm 166 and an attenuating filter 168. The comparator 164 receives an input signal from the system processor 150 corresponding to the desired position of the head 118, as well as the feedback signal from the head 118 corresponding to the actual position of the head 118. Based on the difference between the desired and actual position, the comparator 164 generates a position error signal (PES) along path 170. The PES is provided to the servo processing algorithm 166, which generates a driving energy signal composed of frequency components which range from direct current (DC) to multiple kilohertz or higher. The driving energy signal is provided to the filter 168, which reduces the frequency components at or near the resonance frequencies of the disc drive mechanical structure. The filter 168 then provides the filtered driving energy to the actuator assembly 110, either directly or via the amplifier 162 (FIG. 3).

Figure 5:
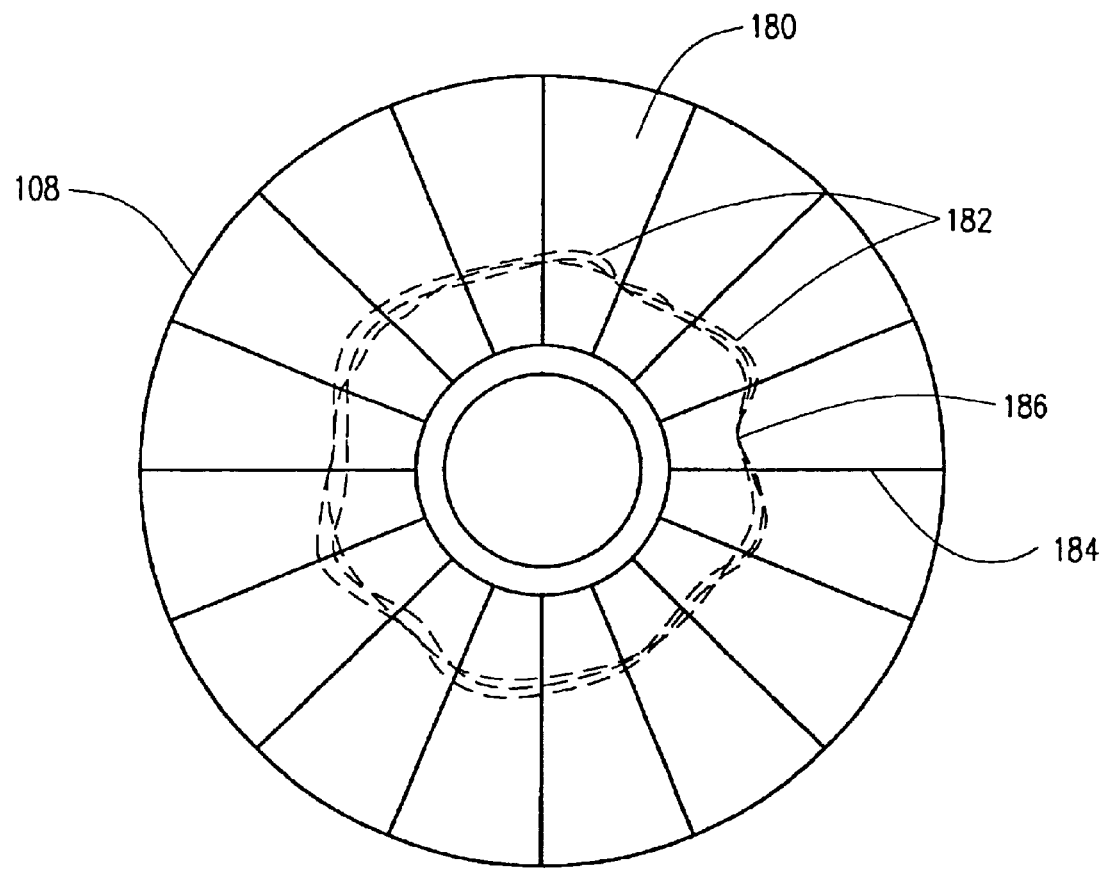
FIG. 5 is a diagrammatic plan view of a data storage medium depicting a pair of erratic servo tracks as typically found in prior art data storage devices.

FIG. 5 is a diagrammatic plan view of one of the data storage discs 108 having a medium 180 on which data is stored, preferably in generally circular and concentric data tracks, each associated with a servo track 182 that is likewise preferably circular and concentric. Two servo tracks 182 are depicted in FIG. 5 which are illustrated as being noncircular and nonconcentric as a result of disturbances during servo track writing. The nonconcentricity creates a track squeeze condition indicated by reference number 186. Also shown are a plurality of servo sectors 184 which include track identification data as well as servo position data that are written by a writing member and that are associated with the respective data track.

Figure 6:
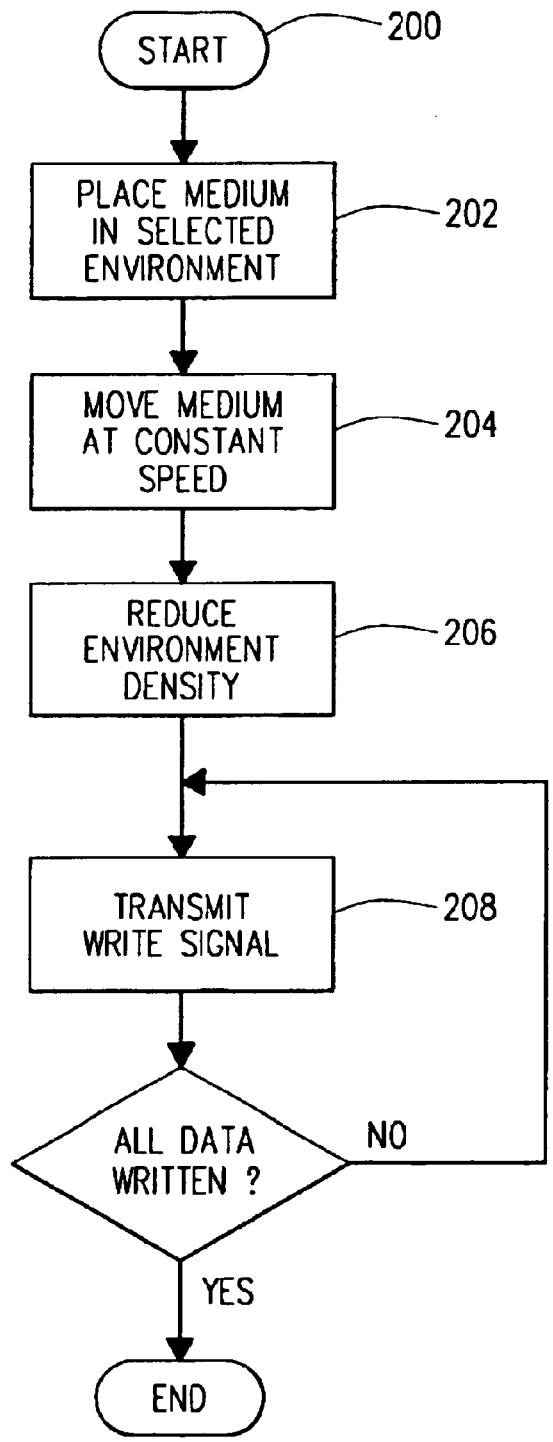
FIG. 6 illustrates a frequency domain for a data storage device with a data storage medium having servo tracks written in accordance with prior art methodology.

The servo tracks 182, as illustrated in FIG. 5, typify the characteristically erratic nature that can result from high-speed writing procedures done either within the disc drive 100 or in a servo track writing apparatus in an ambient air environment. FIG. 6 illustrates empirical data collected from such a process, showing the observed frequency domain for a disc drive having a storage medium with servo tracks written with a servo track writer in an ambient air environment. The peak amplitudes 190 illustrate prominent disc resonances resulting from disturbances affecting disc drive components, such as the disc 108 and the actuator assembly 110. The number of such resonances, and the magnitudes of the resonances, are directly proportional to the propensity for erratic servo track writing illustrated in FIG. 5.

Embodiments of the present invention contemplate a method for writing servo track information to the data storage medium 180. The medium 180 is adapted for use in the data storage device 100 wherein the medium 180 is operably moved in ambient air in the data storage device 100 at a nominal speed in a data reading and writing relationship with a data transfer member, such as the actuator assembly 110. Generally, the embodiments of the present invention contemplate exploiting the advantageous characteristics of writing the servo track information while flying the read/write head 118 in a selected environment of gas with a density less than that of the ambient air.

In a preferred embodiment the selected environment of less dense gas is helium, which is furthermore a stable inert gas. FIG. 7 illustrates a frequency domain for a disc drive that is comparable to FIG. 6 but for which the disc 108 and actuator assembly 110 were operated in a helium environment. It will be noted that the number and magnitude of the peak amplitudes 192 are significantly reduced, resulting in less runout errors during servo track writing. To the benefits inherent in the present invention, the gaseous environment with a concentration of helium at a level greater than 95 percent has been found to be advantageous.

For example, in one embodiment the present invention provides relatively fewer servo data writing errors, such as when writing the track identification and servo position data, by flying the writing member closer to the medium 180 during servo track writing. FIG. 8 illustrates a method for writing servo information 200 which begins at step 202 by placing the medium 180 adjacent a writing member in an enclosure containing a gaseous environment at a selected state. The selected state is preferably substantially the same as the ambient air environment in which the medium normally operates in the data storage device 100. Next, at step 204 the medium 180 is moved at a substantially constant speed, imparting velocity to the gaseous environment which, in turn, impacts the writing member with forces causing the writing member to achieve a first fly height from the medium 180. Subsequently, at step 206 a gas having a density less than the initial gaseous environment is introduced into the enclosure, thereby responsively reducing the fly height of the writing member to a selected height less than the first fly height. Finally, at the reduced fly height at step 208 a write signal is transmitted to the writing member which, in turn, responsively causes the medium 180 to record data represented by the write signal.

For example, in one embodiment the present invention provides relatively faster servo track writing cycle times, thereby increasing process throughput, by moving the medium 180 faster for a particular fly height. FIG. 9 illustrates a method for writing servo information 220 which begins at step 222 by placing the medium 180 adjacent a writing member in an enclosure containing a gaseous environment having a density less than ambient air. In a preferred embodiment the selected gaseous environment comprises helium. Next, at step 224 the medium 180 is moved at a speed substantially greater than the nominal speed, imparting velocity to the gaseous environment which, in turn, impacts the writing member with forces to cause the writing member to fly at a selected distance from the medium 180. Because the gaseous environment is less dense than air alone, the medium 180 can be moved faster to produce a particular fly height, in comparison to ambient air conditions, for a writing member configured for flight in a gaseous environment of a particular predetermined composition at a predetermined rotational speed of the medium 180. For example, in one test it was determined that the disc 108 in a 7,200 RPM (revolutions per minute) disc drive could be spun at about 17,000 RPM in a predominantly helium environment to achieve a particular writing member fly height. Finally, in step 226 a write signal is transmitted to the writing member which, in turn, responsively causes the medium 180 to record data represented by the write signal.

Figure 10:
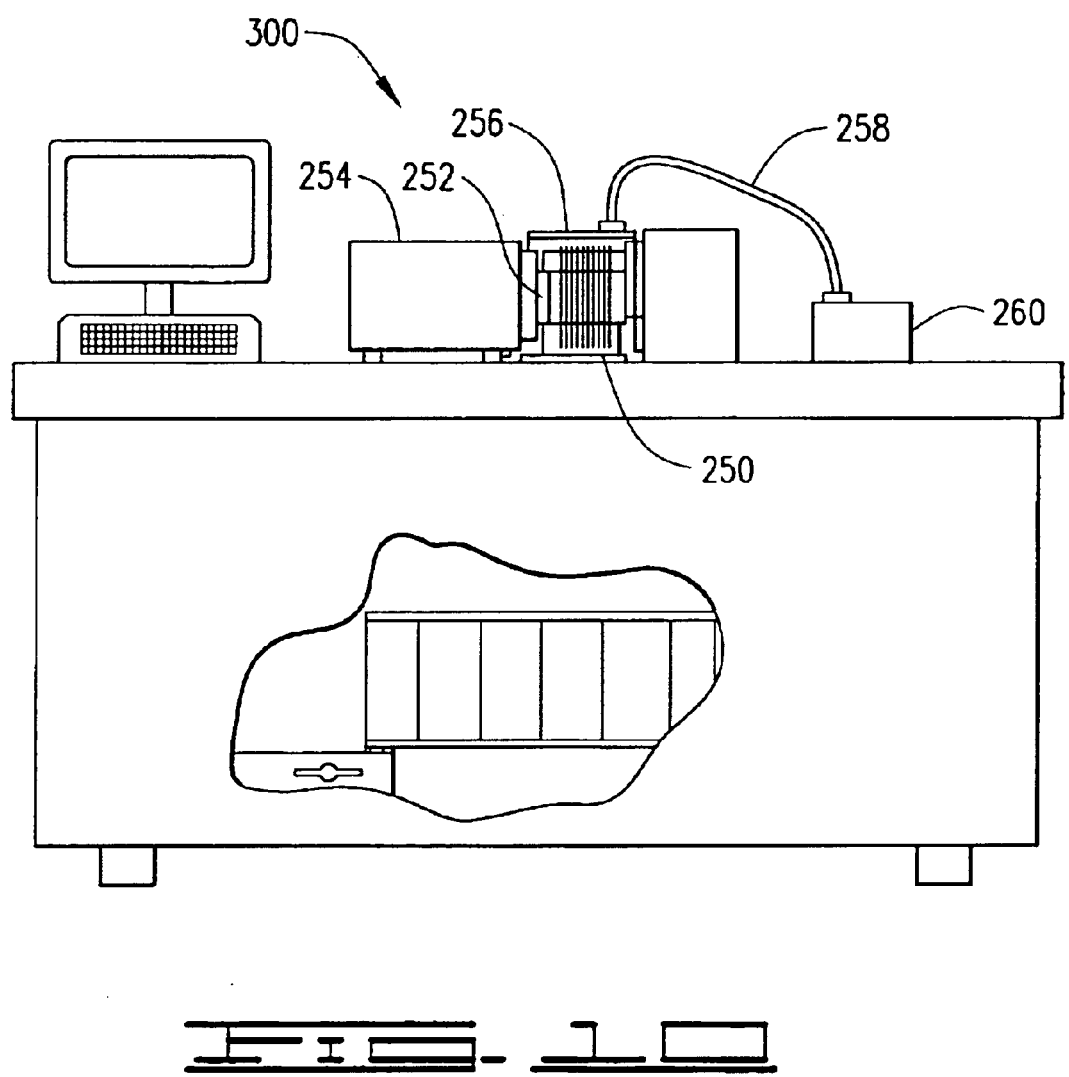
FIG. 10 is a diagrammatic elevational view of a servo track writing apparatus constructed for use in accordance with the embodiments contemplated by the present invention.

The methods of the present invention can be practiced by writing the servo information with a servo track writing apparatus, such as an apparatus 300 shown in FIG. 10. The apparatus 300 has a multi-disc writing capability, accepting a disc stack 250 made up of a plurality of the discs 108. The disc stack 250 is coupled to a motor spindle 252, which is responsive to a drive motor, such as a hydrodynamic spindle motor 254. The disc stack 250 is encapsulated within a closeable enclosure member 256 which sealingly isolates the disc stack 250 from the ambient air environment. An exchange tube 258 is connected between the enclosure 256 and a reservoir 260, which can supply an alternative gaseous environment such as helium.

In summary, embodiments of the present invention are directed to a data storage device (such as 100) comprising a data storage medium (such as 180) having servo information written. The medium is operably moved in ambient air within the data storage device a nominal speed in a data reading and writing relationship with a data transfer member (such as 110) of the data storage device.

In one embodiment the method for writing comprises placing the medium adjacent a writing member in an enclosure containing a gaseous environment comprising a density less than ambient air (such as 222); moving the medium at a speed substantially greater than the nominal speed, imparting velocity to the gaseous environment which, in turn, impacts the writing member with forces flying the writing member a selected distance away from the medium (such as 224); and transmitting a write signal to the writing member which, in turn, responsively affects the medium to record data represented by the write signal (such as 226).

One aspect of the embodiments of the present invention contemplates a disc stack assembly adapted for use in a data storage device wherein the disc stack assembly is operably moved in ambient air within the data storage device a nominal speed in a data reading and writing relationship with a data transfer member of the data storage device, the disc stack assembly comprising a data storage medium comprising servo information written by a method in accordance with the embodiments of the present invention.

One aspect of the embodiments of the present invention contemplates a data storage device, comprising a data storage medium in operable data reading and writing relationship with a data transfer member; and steps for writing servo information to the data storage medium by selectively controlling the fly height of a write member relative to the medium during servo writing operations. Steps for writing servo information includes that which is explicit and implicit from the description and drawings and appended claims, and is expressly not limited to that which is well known and practiced in the art involving merely flying a writing member within an alternative gaseous environment such as helium.

It is to be understood that even though numerous characteristics and advantageous of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the methods employed to unload and fly the writing member may vary while maintaining substantially the same functionality without departing from the scope and spirit of the present invention. In addition, although the preferred embodiment described herein is directed to a data storage device, it will be appreciated by those skilled in the art that the teachings of the present invention can be applied to other systems, like data storage test or certification systems, servo track writers, optical data storage systems, or any other assembled product which can be automatically assembled, without departing from the scope and spirit of the present invention.

What is claimed is:

1. A method comprising:
   placing a data storage medium adjacent a writing member in an enclosure containing a gaseous environment at a selected state;
   moving the medium at a substantially constant speed to impart velocity to the gaseous environment which, in turn, supports the writing member at a first fly height from the medium;
   subsequently introducing a gas having a density less than the gaseous environment into the enclosure, thereby responsively reducing the fly height of the writing member to a selected height less than the first fly height; and
   transmitting a write signal to the writing member while at said reduced fly height which, in turn, responsively effects the medium to record servo information represented by the write signal.

2. The method of claim 1 wherein the placing step comprises placing the medium in a gaseous environment comprising air substantially at ambient conditions.

3. The method of claim 1 wherein the enclosure of the placing step comprises an enclosure of a servo track writer apparatus with a multiple medium writing capability, and wherein the moving, subsequently introducing and transmitting steps are carried out in said apparatus.

4. The method of claim 3 further comprising subsequent steps of removing the medium from the enclosure and installing the medium in a data storage device.

5. The method of claim 3, wherein the medium is characterized as a first medium, wherein the enclosure supports a total number of media m nominally identical to the first medium, and wherein the method further comprises a subsequent step of installing the first medium into a data storage device housing which supports a total number of media n less than m.

6. The method of claim 1 wherein the transmitting step is carried out in a reduced density atmosphere comprising helium at a concentration greater than about 95%.

7. The method of claim 1, wherein the medium is supported in a substantially vertical orientation so as to rotate about a common rotational axis with a substantially horizontal orientation.

8. A data storage medium to which servo information is written by a method comprising:
   placing the medium adjacent a writing member in an enclosure containing a gaseous environment at a selected state;
   moving the medium at a substantially constant speed to impart velocity to the gaseous environment which, in turn, supports the writing member at a first fly height from the medium;
   subsequently introducing a gas having a density less than the gaseous environment into the enclosure, thereby responsively reducing the fly height of the data transfer member to a selected height less than the first fly height; and
   transmitting a write signal to the writing member while at said reduced fly height which, in turn, responsively affects the medium to record the servo information.

9. The medium of claim 8 wherein the placing step comprises placing the medium in a gaseous environment comprising air substantially at ambient conditions.

10. The medium of claim 8 wherein the enclosure of the placing step comprises an enclosure of a servo track writer apparatus with a multiple medium writing capability, and wherein the moving, subsequently introducing and transmitting steps are carried out in said apparatus.

11. The medium of claim 10 wherein the method further comprises subsequent steps of removing the medium from the enclosure and installing the medium in a data storage device.

12. The medium of claim 10 characterized as a first medium, wherein the enclosure supports a total number of media m nominally identical to the first medium, and wherein the method further comprises a subsequent step of installing the first medium into a data storage device housing which supports a total number of media n less than m.

13. The medium of claim 8 wherein the introduced gas is an inert gas.

14. The medium of claim 13 wherein the transmitting step is carried out in a reduced density atmosphere comprising helium at a concentration of above about 95%.

15. The medium of claim 8, wherein the medium is supported within the enclosure in a substantially vertical orientation so as to rotate about a common rotational axis with a substantially horizontal orientation.

16. An apparatus comprising:
   an enclosure adapted to support a data storage medium; and
   means for selectively controlling the fly height of a writing member relative to the medium during a servo writing operation.

* * * * *